(12) United States Patent  (10) Patent No.: US 8,578,214 B2
Dufour et al.  (45) Date of Patent: Nov. 5, 2013

(54) ERROR HANDLING IN A VIRTUALIZED OPERATING SYSTEM

(75) Inventors: Laurent Dufour, Plaisance du Touch (FR); Khalid Filali-Adib, Austin, TX (US); Perinkulam I. Ganesh, Round Rock, TX (US); Balamurugan Ramajeyam, Chennai (IN); Kavitha Ramalingam, Bangalore (IN); David W. Sheffield, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 339 days.

(21) Appl. No.: 13/112,775

(22) Filed: May 20, 2011

(65) Prior Publication Data

US 2012/0066556 A1  Mar. 15, 2012

(30) Foreign Application Priority Data

Sep. 9, 2010 (EP) .................... 10305971

(51) Int. Cl.
*G06F 11/00* (2006.01)
(52) U.S. Cl.
USPC ........................................... 714/38.1
(58) Field of Classification Search
USPC ........................................... 714/38.1
See application file for complete search history.

(56) References Cited

U.S. PATENT DOCUMENTS

| | | | |
|---|---|---|---|
| 4,754,395 A * | 6/1988 | Weisshaar et al. | ............ 719/313 |
| 6,338,147 B1 | 1/2002 | Meth et al. | |
| 7,743,381 B1 | 6/2010 | Tran | |
| 8,214,367 B2 | 7/2012 | Baratto et al. | |
| 2002/0170015 A1 | 11/2002 | Hornung et al. | |
| 2005/0138479 A1 * | 6/2005 | Awada et al. | .................... 714/38 |
| 2006/0218364 A1 | 9/2006 | Kitamura | |
| 2008/0267176 A1 | 10/2008 | Ganesh et al. | |
| 2008/0270422 A1 | 10/2008 | Craft et al. | |
| 2008/0270829 A1 | 10/2008 | Craft et al. | |
| 2008/0294703 A1 | 11/2008 | Craft et al. | |
| 2008/0295111 A1 | 11/2008 | Craft et al. | |
| 2008/0320122 A1 | 12/2008 | Houlihan et al. | |
| 2008/0320123 A1 | 12/2008 | Houlihan et al. | |
| 2008/0320269 A1 | 12/2008 | Houlihan et al. | |
| 2009/0019308 A1 | 1/2009 | Amano | |
| 2009/0037550 A1 | 2/2009 | Mishra et al. | |
| 2009/0094445 A1 | 4/2009 | Brandyberry et al. | |
| 2009/0094582 A1 | 4/2009 | Craft et al. | |
| 2009/0094624 A1 | 4/2009 | Craft et al. | |

(Continued)

OTHER PUBLICATIONS

"U.S. Appl. No. 12/834,038 Office Action", Oct. 23, 2012, 16 pages.

(Continued)

*Primary Examiner* — Bryce Bonzo
(74) *Attorney, Agent, or Firm* — DeLizio Gilliam, PLLC (57) ABSTRACT

When moving workload partitions (WPARs) from machine to machine, operating systems may encounter errors that prevent successful WPAR migration. Recording and reporting errors can be challenging. To move WPARs, the operating system may employ a plurality of software components, such as code residing in user space (e.g., application programs, OS libraries, and shell scripts), code residing in the operating system's kernel, and code residing on remote machines. Embodiments of the invention include a framework that enables all the software components to record errors. The framework can also report the errors to users and processes.

20 Claims, 4 Drawing Sheets

(56) References Cited

U.S. PATENT DOCUMENTS

| | | |
|---|---|---|
| 2009/0112965 A1 | 4/2009 | Ganesh et al. |
| 2009/0112969 A1 | 4/2009 | Ganesh et al. |
| 2009/0157882 A1 | 6/2009 | Kashyap |
| 2010/0082816 A1 | 4/2010 | Kharat et al. |
| 2010/0083283 A1 | 4/2010 | Kharat et al. |
| 2010/0094948 A1 | 4/2010 | Ganesh et al. |
| 2012/0011519 A1 | 1/2012 | Ganesh |
| 2012/0066556 A1* | 3/2012 | Dufour et al. .................. 714/49 |

OTHER PUBLICATIONS

Fauck, Thierry "AIX 6 Workload Partition (WPAR) and Live Application Mobility", http://www.ibm.com/developerworks/aix/library/au-wpar/#download Obtained from internet on Aug. 2, 2010. Sep. 4, 2007, 58 pages.

Miliberg, Ken "Workload Partitioning (WPAR) in AIX 6.1", http://download.boulder.ibm.com/ibmdl/pub/software/dw/aix/au-wpar61aix/au-wpar61aix-pdf.pdf Obtained from internet on Aug. 2, 2010. Apr. 8, 2008, 18 pages.

* cited by examiner

ERROR HANDLING IN A VIRTUALIZED OPERATING SYSTEM

RELATED APPLICATIONS

This application claims the priority benefit of European Patent Application No. EP10305971 filed Sep. 9, 2010, which is hereby incorporated by reference.

BACKGROUND

Some computing platforms provide data processing services for databases, web hosting, virtualized environments, etc. A number of these computing platforms incorporate multiple servers, where data and data processing operations are spread across the multiple servers. Sometimes a server must be shut down for maintenance, upgrades, repairs, etc. To enable such maintenance without disrupting service, the processes and data can be migrated from a first hardware resource (e.g., a first server) to a second hardware resource (e.g., a second server).

SUMMARY

When moving workload partitions (WPARs) from machine to machine, operating systems may encounter errors that prevent successful WPAR migration. Recording and reporting errors can be challenging. To move WPARs, the operating system may employ a plurality of software components, such as code residing in user space (e.g., application programs, OS libraries, and shell scripts), code residing in the operating system's kernel, and code residing on remote machines. Embodiments of the invention include a framework that enables all the software components to record errors. The framework can also report the errors to users and processes.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

Introduction

Embodiments of the inventive subject matter facilitate error logging and reporting in virtualized operating systems. Before discussing details about error logging and reporting, this section will describe virtualized operating systems.

A virtualized operating system can divide a single host (e.g., computer, server, etc.), into multiple partitions, each partition running a separate instance of the operating system. The instances of the operating system are separate in some ways. For example, the instances of the operating system have separate file systems, separate users, separate applications, and separate processes. However, the operating system instances can share a kernel and hardware components, such as processors, network cards, persistent storage devices (e.g., hard drives), etc. Thus, from the point of view of its users, each instance can look and feel like a separate server or machine. However, because the operating system instances share resources of the host, the instances are not actually separate devices. The operating system instances may be referred to as "virtual" or "virtualized" operating systems (virtual OSs), virtual machines, virtual environments, virtual servers, or virtual partitions.

In some embodiments, an administrative user can create logical partitions (LPARs) on a host computer. Each LPAR includes a portion of the host computer's hardware resources, such as processors, memory, storage, devices, etc. The LPAR can coexist on the host computer with other LPARs. More specifically, an administrative user divides a host's hardware resources, so that multiple LPARs can run on the host, with each LPAR operating independently of others, as if each LPAR were a separate machine. The administrative user can install a different operating system on each LPAR. The operating systems can run their own applications separate from any other LPAR. The number of LPARs on a host, however, depends on the host's available resources. For example, to create an LPAR, an administrative user must physically partition a portion of the host's memory and assign the portion of the host's memory to the LPAR. Because LPARs have separation at the hardware level, LPARs can run different operating systems, and provide a very high degree of isolation between LPARs.

Some OSs can create a virtual OS in the form of a workload partition (WPAR). WPARs are a software implementation of operating system virtualization. More specifically, WPARs are software partitions that are created from, run under, and share the resources of a managing instance of the operations system (OS). The WPARs and the managing instance share an identical operating system (e.g., identical version, identical patches, identical tuning options, etc.). The managing instance of the OS is referred to as a global environment or the global OS. Multiple WPARs can run on a single managing resource (e.g., on a single machine or on a single LPAR). An administrative user does not need to physically divide up portions of the host's hardware to create a WPAR. Rather, the administrative user runs a command to generate a WPAR and the global OS creates and manages the WPAR as a software partition.

In some embodiments, the operating system supports two partition types: 1) System WPARs and 2) Application WPARs. System WPARS are virtual system environments that have their own private file systems, users and groups, login, network space, and administrative domain. System WPARs managed by the global OS share the same kernel, the same memory, and some other resources that the global OS uses. Application WPARs are light weight environments used for isolating and executing one or many application processes. Because WPARs are software implementations, WPARs can easily be migrated from one managing resource to another (e.g., from one LPAR to another or from one machine to another).

Figure 1:
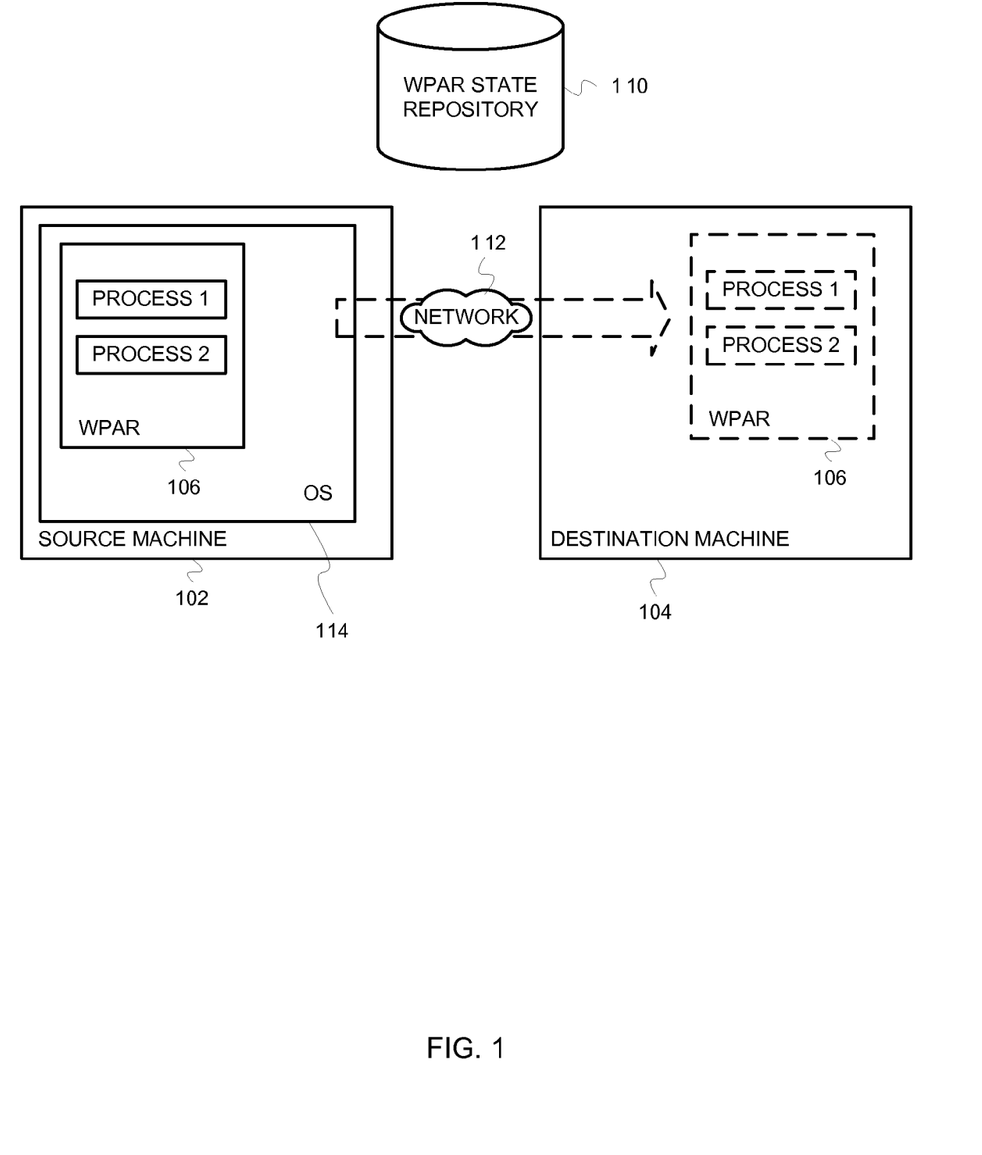
FIG. 1 is a block diagram showing a workload partition migrating from a source machine to a destination machine.

According to some embodiments of the inventive subject matter, an operating system allows administrators to move WPARs form source machines to a destination machines. FIG. 1 is a block diagram showing a workload partition migrating from a source machine to a destination machine. In FIG. 1, a WPAR 106 is part of an operating system ("OS") 114 on a source machine 102. The operating system 114 can move the WPAR 106 to a destination machine 104 over a network 112. The source and destination machines 102 & 104 can be any suitable computers, such as servers (e.g., blade servers, rack-mounted servers, etc.), personal computers, mainframe computers, etc. In some instances, the operating system 114 saves state information (e.g., context of processes 1 and 2) to a WPAR repository 110, and later uses the state information to initiate the WPAR 106 on the destination machine 104. Although not shown, the destination machine 104 includes another operating system that supports the WPAR 106. Administrators may move WPARS when shutting-down machines (e.g., a source machine) for maintenance. An administrator may direct an operating system to move the machine's active WPARs to another machine (e.g., a destination machine). In many instances, such WPAR migration goes largely unnoticed by users, as the operating systems can move WPARs with little loss of service. Although not shown, the operating system 114 may perform operations for: halting a WPAR's processes, saving information necessary for re-starting the WPAR's, analyzing the destination machine for compatibility, reconfiguring WPAR communication information, etc.

When moving WPARs from machine to machine, operating systems may encounter errors that prevent successful WPAR migration. To move WPARs, the operating system may employ a plurality of software components, such as code residing in user space (e.g., application programs, OS libraries and shell scripts), code residing in the operating system's kernel, and code residing on remote machines. Recording and reporting errors during WPAR migration can be challenging. Embodiments of the invention include an error logging framework that enables all the software components to record errors. For example, during WPAR migration, failures can occur while recording state information for a process in a source machine (a.k.a. "checkpointing"), or while restarting the process in a destination machine. When such failures occur, embodiments of an error logging framework facilitate error message reporting to the WPAR migration process from the context of the failed process. Without the error logging framework, processes may return error codes (e.g., integers), which do not give detailed information about failures. Detailed error information may only be available at the point where an error occurred. Thus, some embodiments of the error logging framework facilitate error logging where errors occur. The framework can also report the errors to users and processes.

Operations

Figure 2:
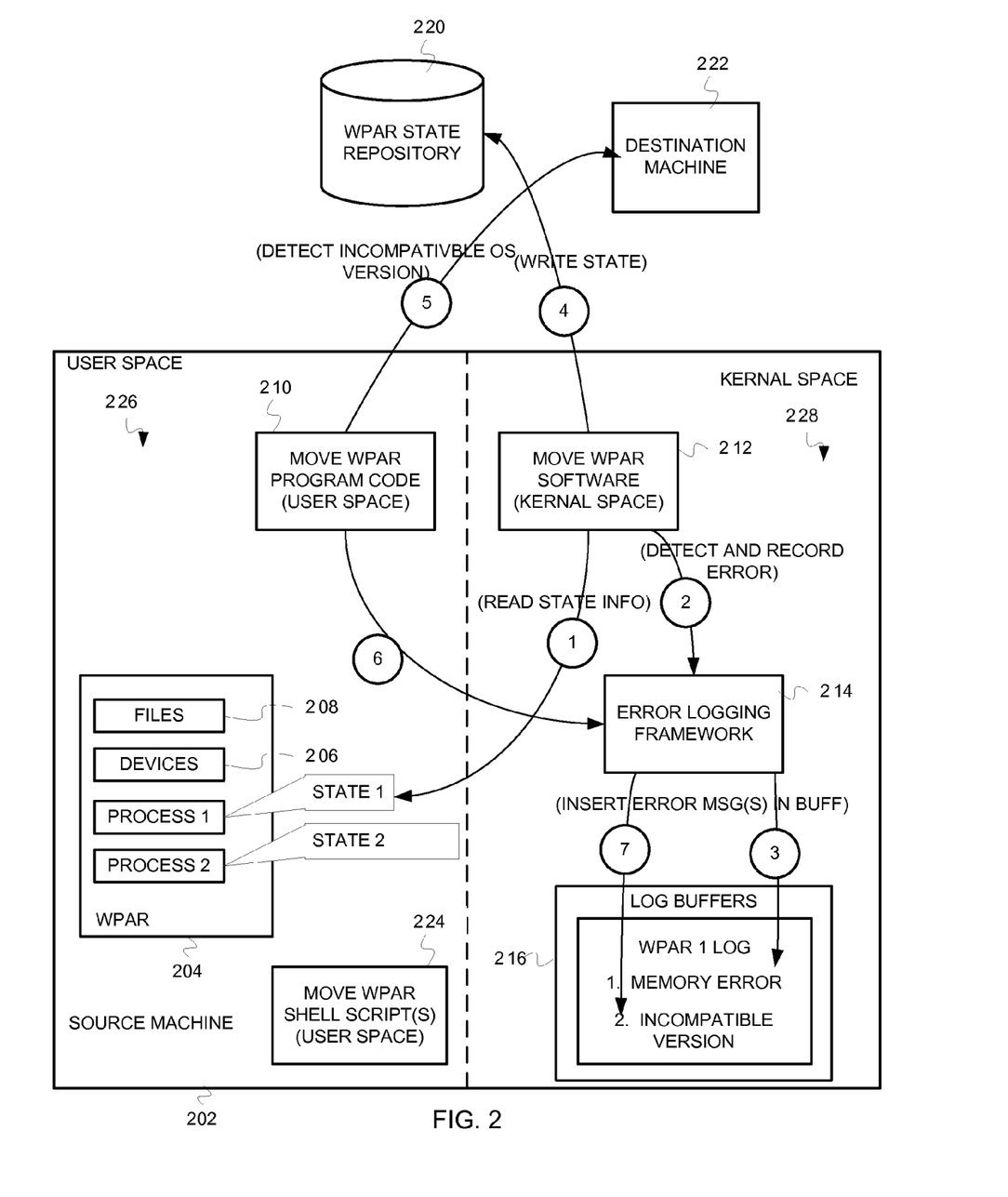
FIG. 2 is a block diagram illustrating operations for migrating workload partitions between computers, according to some embodiments.
Figure 3:
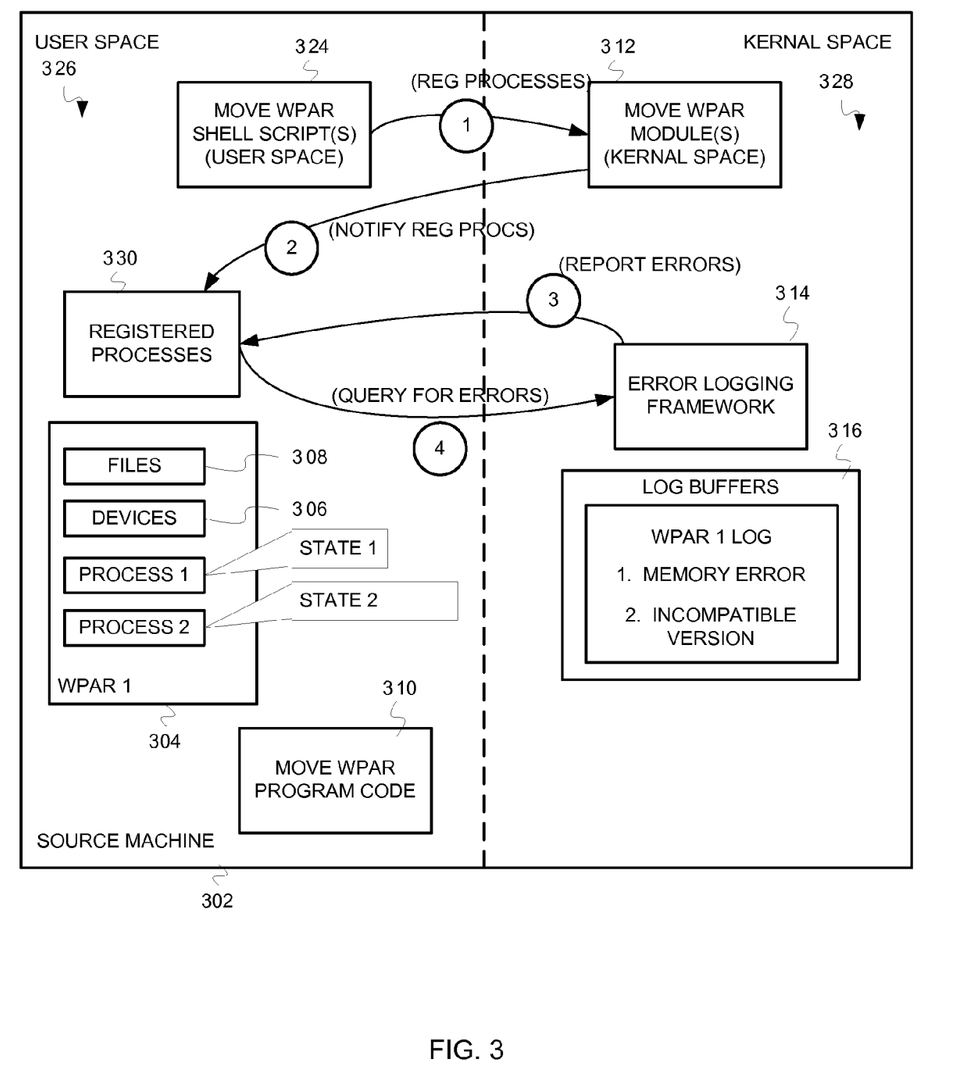
FIG. 3 is a block diagram illustrating operations for reporting errors detected during WPAR migration, according to some embodiments.

As described above, embodiments of the inventive subject matter facilitate error logging and reporting that occur while moving virtual partitions between machines. This section will describe FIGS. 2 and 3, and some operations for recording and reporting errors that occur while migrating components of a virtualized operating system. In FIGS. 2 and 3, the operations for moving a WPAR are performed by a plurality of components, such as kernel programs, application programs, and shell scripts. Because a plurality of components are involved, an error logging framework provides a facility by which all components can record and report errors. In some instances, the error logging framework reports errors to users at terminals, while in other instances, the frame work reports errors to programs that have registered to receive information about migrating WPARs.

FIG. 2 is a block diagram illustrating operations for migrating workload partitions between computers, according to some embodiments. FIG. 2 shows a source machine 202, destination machine 222, and a WPAR state repository 220. The source machine includes a memory space divided into a user space 226 and a kernel space 228. The user space 226 includes a workload partition 204, which includes a file system 208, devices 206, and processes 1 and 2 (e.g., a user application programs). The user space 226 also includes software modules for moving workload partitions, where such software includes program code 210 (e.g., OS library code) and shell scripts 224. In some embodiments, the workload partition 204, file system 208, program code 210, and other components are part of an AIX® Operating System available from IBM Corp. In some instances, the user space code includes a WPAR Dynamic Relocation (WPARDR) library that is part of the AIX operating system. The WPARDR library facilitates WPAR migration in phases (eg. pre-<event>-dr, post-<event>-dr). Although not shown in FIG. 2, the user space code can include third party user-space Dynamic Relocation handler code that has registered to be notified on WPARDR operations (see registered processes 330 in FIG. 3). These user space components can log error messages using the error logging framework 214.

The kernel space 228 includes kernel software modules for moving workload partitions (see 212), an error logging framework 214, and log buffers 216. In some embodiments, the components in the kernel space 228 are not accessible to components outside the kernel space 228, except via system calls. For example, components in the user space 226 can only access the log buffers 216 via a system call to the error logging framework 214.

In FIG. 2, the operations for moving the WPAR 204, from the source machine 202 to the destination machine 222, occur in five stages. In some embodiments, the operations are performed by a plurality of components, such as kernel programs (kernel space), application programs (user space), OS libraries (user space), and shell scripts (user space). Because a plurality of components are involved, the error logging framework 214 provides a facility by which all components involved in moving a WPAR can record and report errors.

During stage 1, software in the kernel space 228 detects an instruction to move the WPAR 204 to the destination machine 222. In carrying out the "move" instruction, the kernel software 212 reads state information about the processes in the WPAR 204. The state information can include the processes register values, stack values, communication information (e.g., open sockets), variable values, and any other information necessary for restarting the processes on the destination machine 222.

During stage 2, the kernel software 212 encounters an error when reading the state information. The error can be any condition that may prevent successful migration of the WPAR 204, such as problems reading the state information (e.g., memory errors), problematic devices, missing files, problematic process terminations, etc. After detecting an error, the kernel software 212 executes a call to the error logging framework 214, where the call will cause the error logging framework 214 to store an error message in the log buffer 216.

During stage 3, the error logging framework 214 inserts an error message into the log buffers 216. As shown, the framework 214 inserts a "memory error" message in a buffer space associated with the WPAR 204. In some instances, the log buffers 216 include a separate buffer for each WPAR residing in the user space 226. However, because the user space 226 includes only one WPAR, the log buffer 216 includes only one buffer for WPAR 204.

After the error logging framework 214, the kernel software 212 writes the state information to the WPAR state repository 220 (see stage 4). In some applications, an operating system residing on the destination machine 222 reads, from the repository 220, the state information for configuring the WPAR on the destination machine 222. During stage 5, the application code 210 (residing in user space 226) determines whether the destination machine 222 includes an operating system compatible with the WPAR 204. As shown, the application code 210 detects an incompatible operating system version, so it reports an error to the error logging framework 214 (see stage 6). In turn, the error logging framework 214 records and error message in the log buffers 216 (see stage 7).

FIG. 2 shows a limited number of errors. However, the components shown in FIG. 2 are not so limited, as they can detect and record any errors, such as: 1) source and destination machines have incompatible operating system versions, 2) kernel extensions used by a WPAR migration component is not loaded on the destination machine, 3) dependent library version mismatches; 4) failure of a WPAR migration component, 4) debugger processes and debugged processes are cannot be "checkpointed," 5) etc. Furthermore, FIG. 2 shows two calls to the error logging framework 214. However the WPAR migration components can make any number of calls to the error logging framework 214. The number of calls may depend on the number of errors detected during WPAR migration.

The operations of FIG. 2 show how various components involved in moving the WPAR can detect and record errors in a common location. Although not shown in FIG. 2, some embodiments of the error logging framework 214 report errors after they are recorded in the log buffers 216. For example, after recording an error, the framework 214 can write the error to a standard output file, such as a command line, a graphical user interface error window, etc. As a result, the framework 214 can record and notify users about WPAR migration errors during all phases of the WPAR migration. Some embodiments of the error logging framework 314 can translate error messages between different languages. For example, when writing an error message to a standard output file, the framework 314 can translate an English error message into Japanese. Alternatively, it can translate an encoded error message into any suitable language.

This discussion continues with operations for reporting errors that have been recorded in the log buffers. In addition to writing errors to output devices, some embodiments of the error logging framework notify various programs about errors detected during a WPAR migration.

FIG. 3 is a block diagram illustrating operations for reporting errors detected during WPAR migration, according to some embodiments. Like the embodiment shown in FIG. 2, FIG. 3 shows a source machine 302 that includes a memory space divided into a user space 326 and a kernel space 328. The user space 326 includes a workload partition 304, which includes a file system 308, devices 306, and processes 1 and 2 (e.g., user application programs). The user space 326 also includes software for moving workload partitions, where such software includes program code 310 and shell scripts 324. The kernel space 328 includes kernel software for moving workload partitions (see 312), an error logging framework 314, and log buffers 316.

In FIG. 3, the error logging framework 314 reports errors to a group of processes that have registered to receive notifications about the WPAR 304 migrating away from the source machine 302. The error reporting operations occur in four stages. During stage 1, one or more shell scripts 324 registers a group of processes 330 to receive, from the kernel code 312, notifications when the WPAR 304 is to be moved from the source machine 302. The notifications can indicate that a WPAR migration has commenced. Alternatively, the notifications can indicate a time at which the WPAR migration will commence. The notifications can also include other information about the WPAR migration, such as information about the name of the WPAR being moved.

During stage 2, the kernel modules notify the registered processes 330 that a migration of WPAR 304 has commenced. During stage 3, after learning that the WPAR 304 is being moved, one or more of the registered processes 330 may choose to fail the WPAR migration. These registered processes can log an error message using error logging framework 314. In some embodiments, one or more of the registered processes 330 can call the error logging framework 314, inquiring about errors discovered during WPAR migration. In turn, the error logging framework 314 reports any errors that have been recorded to the log buffers 316 (see stage 4). For example, the framework 314 may report a memory error and an incompatible operating system error.

System

Figure 4:
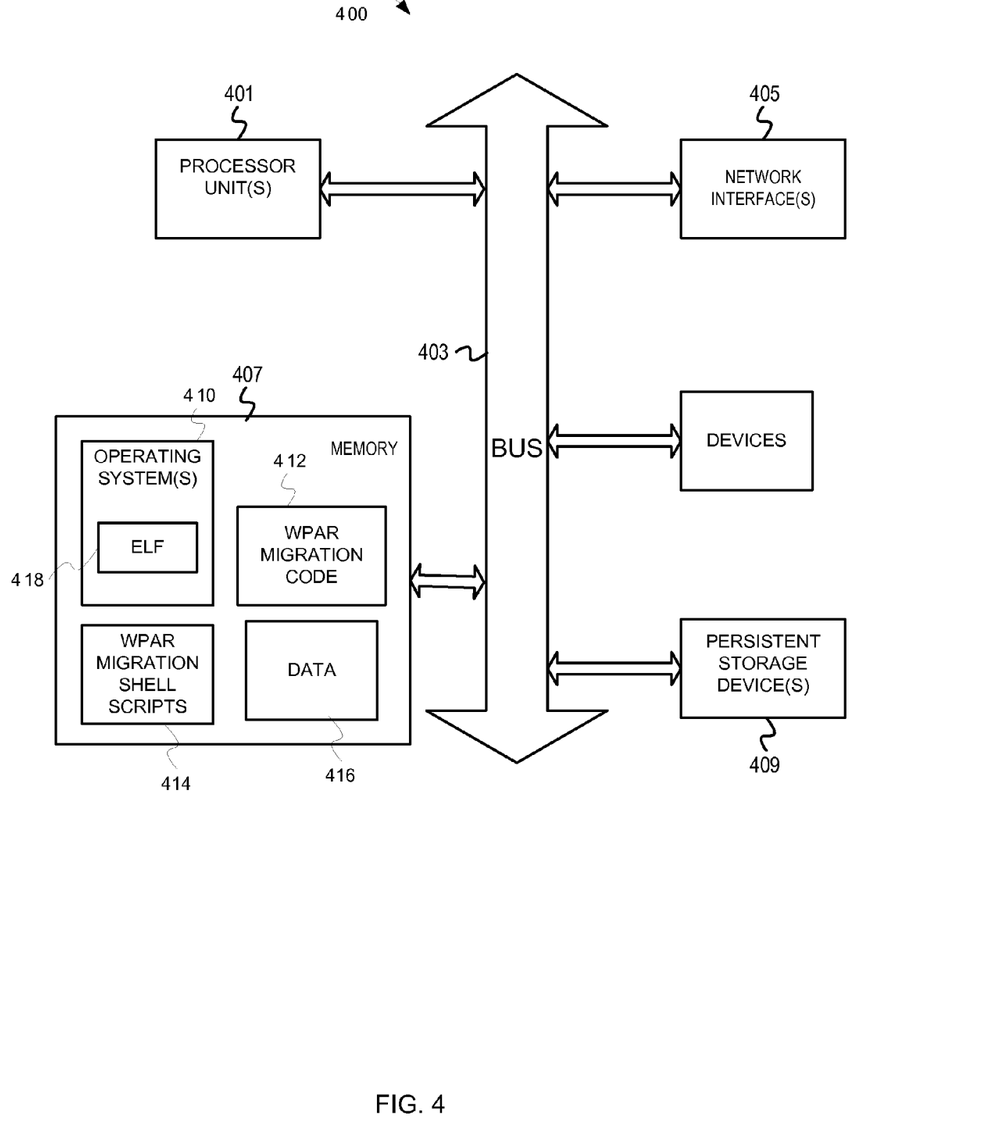
FIG. 4 depicts an example computer system, according to some embodiments.

FIG. 4 depicts an example computer system, according to some embodiments. A computer system 400 includes a processor unit 401 (possibly including multiple processors, multiple cores, multiple nodes, and/or implementing multithreading, etc.). The computer system includes memory 407. The memory 407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. In some embodiments, the memory 407 includes an operating system 410, WPAR migration code 412, WPAR migration shell scripts 414, and data 416. In some embodiments, portions of the WPAR migration code and the shell scripts 414 can reside in memory space reserved for user programs and data. Furthermore, portions of the code 412 can reside in space reserved for an operating system kernel. As shown, the operating system 410 includes an error logging framework (see ELF 418). Although not shown, the memory can be organized as shown in FIGS. 2 and 3.

The computer system 400 also includes a bus 403 (e.g., PCI, ISA, PCI-Express, HyperTransport®, InfiniBand®, NuBus, etc.), a network interface 405 (e.g., an ATM interface, an Ethernet interface, a Frame Relay interface, SONET interface, wireless interface, etc.), and a persistent storage device(s) 409 (e.g., optical storage, magnetic storage, etc.).

The computer system 400 can perform any of the operations described above. In some embodiments, the operations are performed when the processor unit(s) 401 execute the software components that reside in memory 407. However, any one of these operations may be partially (or entirely) implemented in hardware. For example, the operations may be implemented with an application specific integrated circuit, in logic implemented in the processing unit 401, in a co-processor on a peripheral device or card, etc. Further, realizations may include fewer or additional components not illustrated in FIG. 4 (e.g., video cards, audio cards, additional network interfaces, peripheral devices, etc.). The processor unit 401, the storage device(s) 409, and the network interface(s) 405 are coupled to the bus 403. Although illustrated as being coupled to the bus 403, the memory 407 may be coupled to the processor unit 401.

Aspects of the present inventive subject matter may be embodied as a system, method, and/or computer program product. Accordingly, aspects of the present inventive subject matter may take the form of an entirely hardware embodiment, an entirely software embodiment (including firmware, resident software, micro-code, etc.) or an embodiment combining software. Furthermore, aspects of the present inventive subject matter may take the form of a computer program product embodied in one or more computer readable medium(s) having computer readable program code embodied thereon.

Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on one computer as a stand-alone software package, or on multiple computers (e.g., remote computers) Remote computers may be connected to through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the embodiments are described with reference to various implementations and uses, these embodiments are illustrative and the scope of the inventive subject matter is not limited to them. In general, techniques for recording and reporting errors that occur during WPAR migration may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for logging errors that arise while moving a workload partition of an operating system from a source machine to a destination machine, the method comprising:
   halting processes executing in the workload partition;
   determining state information of the processes, wherein the determining is performed by a first group of one or more modules residing on the source machine in memory space assigned to a kernel of the operating system;
   detecting, based on the state information, a first error affecting movement of the workload partition from the source machine to the destination machine, wherein the detecting is performed by one or more of the first group of modules;
   writing a first message into a log buffer stored on the source machine in the memory space assigned to the kernel, wherein the first message describes the first error, and wherein the writing the first message occurs via a call, by one or more of the first group of modules, to an error logging framework residing in the memory space assigned to the kernel;

detecting a second error affecting the movement of the workload partition from the source machine to the destination machine, wherein the detecting the second error is performed by a second group of one or more modules residing on the source machine in memory space assigned to user programs; and writing a second message into the log buffer, wherein the second message describes the second error, and wherein the writing of the second message occurring via a call by the second group of modules to the error logging framework.

2. The method of claim 1 further comprising:
reading the first and second messages from the log buffer; and
presenting the first and second messages on an output device.

3. The method of claim 2 further comprising:
translating the first and second messages into a selected language.

4. The method of claim 1 further comprising:
determining a list of processes residing on the source machine to notify about the movement of the workload partition from the source machine to the destination machine;
notifying the processes of the list that the workload partition is moving.

5. The method of claim 1, wherein the second group of modules include one or more of application programs and shell scripts.

6. The method of claim 1, wherein the first and second errors will cause movement of the workload to fail.

7. An computer comprising:
a processor;
a memory configured to include a user space and a kernel space, wherein the user space includes a workload partition including processes;
a first group of modules residing in the user space, the first group of modules configured to
migrate the workload partition to a destination computer; and
detect a first error affecting the migration of the workload partition to the destination machine; and
an error logging framework residing in the kernel space of the memory, the error logging framework configured to
write a first message into a log buffer residing in the kernel space of the memory, wherein the first message describes the first error, and wherein writing the first message occurring via a call, by the first group of modules, to the error logging framework.

8. The computer of claim 7 comprising:
a second group of modules residing in kernel space of the memory, the second group of modules configured to
detect a second error affecting the migration of the workload partition the destination computer; and
writing a second message into the log buffer, wherein the second message describes the second error, and wherein writing of the second message occurring via a call by the second group of modules to the error logging framework.

9. The computer of claim 8, wherein the second group of modules is further configured to
determine a list of processes residing on the source machine to notify about the migration of the workload partition from the source machine to the destination machine; and
notify the processes of the list that the workload partition is moving.

10. The computer of claim 7, wherein the error logging frame work is further configured to
read the first and second messages from the log buffer; and
present the first and second messages on an output device of the computer.

11. The computer of claim 7, wherein the error logging frame work is further configured to translate the first and second messages into a selected language.

12. The computer of claim 7, wherein the first group of modules include one or more of application programs and shell scripts.

13. The computer of claim 7, wherein the first and second errors will cause migration of the workload partition to fail.

14. A computer program product for logging errors that arise while moving a workload partition of an operating system from a source machine to a destination machine, the computer program product comprising:
a computer readable storage medium having computer readable program code embodied therewith, the computer readable program code configured to, halt processes executing in the workload partition;
determine state information of the processes, wherein the determination is performed by a first group of one or more modules residing on the source machine in memory space assigned to a kernel of the operating system;
detect, by the first group of modules, a first error affecting the movement of the workload partition from the source machine to the destination machine, wherein the detection of the first error results from the determining the state information; and
record a first message into a log buffer stored on the source machine in the memory space assigned to the kernel, wherein the first message describes the first error, and wherein recordation of the first message occurring via a call, by the first group of modules, to an error logging framework residing in the memory space assigned to the kernel.

15. The computer program product of claim 14, wherein the computer readable program code is further configured to
detect a second error affecting the movement of the workload partition from the source machine to the destination machine, wherein the detecting is performed by a second group of one or more modules residing on the source machine in memory space assigned to user programs; and
write a second message into the log buffer, wherein the second message describes the second error, and wherein the writing of the second message occurring via a call by the first group of modules to the error logging framework.

16. The computer program product of claim 15, wherein the computer readable program code is further configured to:
read the first and second messages from the log buffer; and
present the first and second messages on an output device.

17. The computer program product of claim 15, wherein the second group of modules include one or more of application programs and shell scripts.

18. The computer program product of claim 14, wherein the computer readable program code is further configured to:
   translating the first message into a selected language.

19. The computer program product of claim 14, wherein the computer readable program code is further configured to:
   determine a list of processes residing on the source machine to notify about the movement of the workload partition from the source machine to the destination machine;
   notify the processes of the list that the workload partition is moving.

20. The computer program product of claim 14, wherein the first error will cause movement of the workload to fail.

* * * * *